United States Patent [19]

Fukuda et al.

[11] Patent Number: 4,690,849

[45] Date of Patent: Sep. 1, 1987

[54] CONTACT MATERIAL FOR TREATING SEWAGE OF BRAIDED PILE MATERIAL

[75] Inventors: Ken Fukuda; Hisaaki Ueba, both of Mibu, Japan

[73] Assignees: Kureha Kagaku Kogyo Kabushiki Kaisha, Tokyo; Kureha Gosen Kabushiki Kaisha, Shimotsuga, both of Japan

[21] Appl. No.: 875,681

[22] Filed: Jun. 18, 1986

[30] Foreign Application Priority Data

Jun. 21, 1985 [JP] Japan ................................. 60-135405

[51] Int. Cl.$^4$ .............................................. B32B 3/02
[52] U.S. Cl. ......................................... 428/91; 87/11; 428/95
[58] Field of Search ....................... 428/85, 92, 91, 95; 87/8, 11, 41

[56] References Cited

FOREIGN PATENT DOCUMENTS 49-134965 12/1974 Japan .
5628199 10/1976 Japan .
56-134243 10/1981 Japan .

Primary Examiner—Marion E. McCamish
Attorney, Agent, or Firm—Oblon, Fisher, Spivak, McClelland & Maier

[57] ABSTRACT

Disclosed herein is a contact material for treating sewage, comprising a braid which is made of synthetic fibers and has loop piles, the weight of the synthetic fibers forming the loop piles being from 40 to 90% by weight of the synthetic fibers of the whole body of the braid.

8 Claims, No Drawings

CONTACT MATERIAL FOR TREATING SEWAGE OF BRAIDED PILE MATERIAL

BACKGROUND OF THE INVENTION

The present invention relates to a contact material for use in treatment of sewage, particularly in treatment of sewage by contact aeration method, and more in detail, relates to the contact material comprising a braid which is made of synthetic fibers and has loop piles, the weight of the synthetic fibers forming the loop pile part being from 40 to 90% by weight of the total amount of the synthetic fibers of the whole body of the braid.

In recent years, with the spread of sewage-treatment by the contact aeration method, various contact materials have been proposed.

Hitherto, as the contact material for treating sewages, several braid-like bodies have been known, such as a braid-like body made by winding a belt-like body, with a state of having ring-like or hook-like small bodies grown thickly thereon, round a core material comprising a metal such as aluminum and another braid-like body made by twisting the above-mentioned belt-like body to left or right and further one more braid-like body made by applying a tension to the vertical direction of the above-mentioned belt-like body.

However, there are several problems to utilize these contact materials as follows:

(1) it is complicate and expensive to construct the materials, (2) it is difficult to make micro-organisms adhere to the material in an amount sufficient to purify sewage because the thickness of braid-like bodies of the materials is limited due to the manufacturing process. (It has been observed that one adhered micro-organisms is detached from the materials), and (3) accordingly, the capacity to treat sewage becomes low or it becomes necessary to use large number of the materials to keep sewage clean.

As a result of the present inventors' studies on the contact material to which a sufficient amount of micro-organism for effective cleaning of sewage adheres in a stabilized stage, with an intention of solving the above problems, it has been found that a contact material comprising a braid which is made of synthetic fibers and has loop piles thereon, the weight of the synthetic fibers of loop pile part being from 40 to 90% by weight of the synthetic fibers of the whole body of the braid, is able to achieve the cleaning of sewage in a smaller amount as compared to the conventional contact material, and based on this finding, the present invention has been attained.

SUMMARY OF THE INVENTION

In an aspect of the present invention, provided there is a contact material for treatment of sewage, comprising a braid which is made of synthetic fibers and has loop piles, the amount of the synthetic fibers forming the loop pile part being from 40 to 90% by weight of the synthetic fibers of the whole body of the braid.

The object of the present invention is to provide a contact material to which a sufficient amount of micro-organism for the effective cleaning a sewage can adhere in a stabilized state and which has a strength for enduring the hydraulic pressure of the flow of sewage, and another object of the present invention is to provide a contact material for treatment of sewage, which is inexpensive and easy to handle.

DETAILED DESCRIPTION OF THE INVENTION

The braid, which is used as the contact material for treating sewage, according to the present invention can be prepared, for example, by applying the braid-making apparatus disclosed in Japanese Patent Application Laying-Open (KOKAI) No. 56-134243 (1981), by making the loop piles grow thickly on the braid in all directions perpendicular to the axis of the braid. In addition, in preparing the braid, a part of the original fibers constructing the braid forms the core part of the braid and other part of the original fibers forms the loop piles, and in the case of using the braid, the muddy substance (namely a lump of micro-organism) adheres to the loop piles by adsorption, and sewage is cleaned by the action of the micro-organism adhering on the loop piles. Accordingly, the constitution of the loop pile is important and it must be suitable for the stable adherence of the micro-organism.

Namely, in the case where the weight ratio of the synthetic fibers forming the loop piles to the synthetic fibers of the whole braid is too small, the part to which the muddy substance are adsorbed is small resulting in the poor ability of cleaning sewage. On the other hand, in case where the above-mentioned weight ratio is too large, the strength of the core part of the braid becomes weak resulting in the reduction of the resistance to the vibration due to the flow of the sewage to be treated. In such a case, the muddy substance adhering to the loop pile becomes to be easily detachable and there is also a fear of destruction of the contact material itself.

According to the present invention, from the above-mentioned viewpoint, by controlling the weight ratio of the synthetic fibers forming the loop piles to the synthetic fibers forming the whole braid from 40 to 90%, the muddy substance is sufficiently adsorbed onto the loop pile part of the braid in a stabilized state and in the same time, the strength of the core part of the braid is sufficiently retained. In addition, on controlling the weight ratio from 60 to 80%, it is particularly effective in practical use.

Further in the present invention, in using the synthetic fibers, when the diameter of the unit filament used in the part of loop piles is from 40 to 120 $\mu$m, it becomes possible to raise the adsorbing capacity for the muddy substance and the ability of holding the adsorbed muddy substance.

In case where the diameter of the unit filament of the synthetic fibers used in the loop piles is below 40 $\mu$m, although the adherence of the muddy substance in the initial stage is favorable, the loop piles are bent downwards by the increased weight of the adhered muddy substance as the time passes resulting in the easy detachment of the muddy substance from the loop piles and also in the reduction of the contact surface of the loop pile to the muddy substance. Such a situation reduces the capacity of cleaning the sewage. On the other hand, in case where the diameter is over 120 $\mu$m, the adherence of the muddy substance is poor.

In addition, the diameter of the unit filament of from 60 to 100 $\mu$m is particularly effective in keeping the adsorbed muddy substance in a stabilized state.

Furthermore, according to the present invention, it is able to increase the adsorbed amount of the muddy substance in the loop pile and prevent the detachment of the adhered muddy substance by controlling the diameters of the cross-section of the braid including the loop pile part perpendicular to the axis of the braid from 25 to 80 mm, preferably 40 to 65 mm.

In case where the above-mentioned diameters are over 80 mm, the bending-down phenomenon of the loop piles occur to cause the detachment of the adhered muddy substance and at the same time, to cause the reduction of the contact surface area of the loop piles. On the other hand, in case where the diameters are below 25 mm, since the amount of the adhered muddy substance per braid is too small, it becomes necessary to use a large number of the braid. Namely, such a situation is not economical.

As the synthetic fiber for preparing the contact material according to the present invention, the synthetic fibers, used generally in clothes and industrial materials, such as those made of polyethylene, polypropylene, polyester, nylon, polyvinylidene chloride, polyvinyl chloride, polyvinylformal (formalized polyvinyl alcohol), etc. may be used. As the synthetic fibers used in the part forming the loop piles, the synthetic fiber of polyvinylidene chloride series is particularly effective.

In case of using the synthetic fiber of vinylidene chloride as the basic fiber for forming the loop piles of the braid, the capacity of the loop pile in adsorbing the muddy substance is superior to that of the loop pile made of other synthetic fibers and the ability of maintaining the adsorbed muddy substance is also favorable, and accordingly, the ability of cleaning the sewage becomes high.

In this connection, the ground explaining the above-mentioned facilities of the synthetic fiber of polyvinylidene chloride series has not been elucidated, however, it is presumed that since the specific gravity of the fiber is relatively large among the generally used synthetic fibers, the stabilized resistance thereof to the hydraulic flow of the sewage is high, and on the other hand, the elastic recovering power thereof is also large, therefore, the fiber may be able to form the stabilized loop piles.

In addition, the synthetic fibers of polyvinylidene chloride series are excellent in light resistance and chemical resistance as well as inendurance in sewages and accordingly, the fibers of polyvinylidene chloride can be said to be the suitable material as a contact material for sewage treatment.

As has been described, according to the present invention, the capacity of adsorbing the muddy substance and the ability of maintaining the adsorbed muddy substance on the contact material has been remarkably improved by controlling the constitution of the loop piles part, and the contact material according to the present invention can be said to be extremely effective as the contact material for treating sewage.

The braid according to the present invention is the general term of the braids prepared by braid-making machines, and round braids, flat braids, twisted braids, spins and spindle bands may be exemplified.

The present invention will be concretely explained while referring to the non-limitative example as follows.

EXAMPLE

By using a braid-making machine to pull out loop piles from basic fibers of braid core, braids were prepared so that the weight ratios of the synthetic fibers forming the loop piles to the synthetic fibers of the whole braid are 30%, 40%, 50%, 60%, 70%, 80%, and 90%, respectively. In addition, the whole braids were prepared by using polyvinylidene chloride fibers. The diameter of unit filament of the fibers was 100 μm, and the cross-sectional diameters of the loop piles perpendicular to the axis of the braid were around 45 mm.

By using each of the seven kinds of the thus prepared braids, a contact material comprising the each braid of 32 cm in length was fixed in an aluminum frame.

Each of the contact materials were set in a water tank of 50 cm in depth, 50 cm in length and 32 cm in width (actual capacity of 72 liters) and a sewage of about 300 mg of BOD/liter was introduced into the tank at a rate of 70 liters/day while bubbling air from the three inlets at the bottom of the tank at a total rate of 2 liters/min. After carrying out the above-mentioned treatment of the sewage for 10, 20 and 30 days, BOD (Biological Oxygen Demand) of both the original sewage and the treated sewage were measured, the results being shown in the following Table.

TABLE

| | Weight*1 ratio (%) | Rate of removal of BOD (%)*2 after 10 days | after 20 days | after 30 days | Average of 3 points (%) |
|---|---|---|---|---|---|
| Present invention | 40 | 40.3 | 55.1 | 50.9 | 48.8 |
| | 50 | 62.1 | 57.4 | 60.5 | 60.0 |
| | 60 | 64.4 | 67.3 | 68.8 | 66.8 |
| | 70 | 65.2 | 70.2 | 69.3 | 68.2 |
| | 80 | 70.3 | 67.1 | 71.0 | 69.4 |
| | 90 | 72.9 | 69.6 | 73.7 | 72.1 |
| Comparative example | 30 | 35.7 | 20.9 | 28.6 | 28.4 |

Notes: [1]Weight ratio of the synthetic fibers forming the loop piles of the braid to the synthetic fibers of the whole braid.
[2]Rate of removal = $\frac{\text{BOD in the original sewage} - \text{BOD in the treated sewage}}{\text{BOD in the original sewage}} \times 100$

What is claimed is:

1. A contact material for treating sewage, comprising a braid which is made of synthetic fibers and has loop piles, said synthetic fibers forming said loop piles being from 40 to 90% by weight of said synthetic fibers of the whole braid.

2. A contact material according to claim 1, wherein said synthetic fibers forming said loop piles are from 60 to 80% by weight of said synthetic fibers of the whole braid.

3. A contact material according to claim 1, wherein the diameter of unit fiber of said synthetic fibers forming said loop piles is from 40 to 120 μm.

4. A contact material according to claim 3, wherein the diameter of unit fiber of said synthetic fibers forming said loop piles is from 60 to 100 μm.

5. A contact material according to claim 1, wherein the diameter of said braid including said loop pile part in the cross section perpendicular to the axis of said braid is from 25 to 80 mm.

6. A contact material according to claim 5, wherein said diameter of the braid is from 40 to 65 mm.

7. A contact material according to claim 1, wherein said synthetic fiber is a single or a mixture of synthetic fiber of polyethylene series, polypropylene series, polyester series, nylon series, polyvinylidene chloride series, polyvinyl chloride series or polyvinylformal series.

8. A contact material according to claim 1, wherein said synthetic fiber forming said loop piles is made of polyvinylidene chloride series.

* * * * *